United States Patent
Simard et al.

(10) Patent No.: US 8,141,896 B2
(45) Date of Patent: Mar. 27, 2012

(54) TANDEM SUSPENSION FOR A VEHICLE

(75) Inventors: André-Marie Simard, Baie St-Paul (CA); Réjean Lavoie, Baie St-Paul (CA); Nelson Côté, Baie St-Paul (CA)

(73) Assignee: Simard Suspensions Inc., Baie St-Paul, Quebec (CA)

( * ) Notice: Subject to any disclaimer, the term of this patent is extended or adjusted under 35 U.S.C. 154(b) by 0 days.

(21) Appl. No.: 12/978,084

(22) Filed: Dec. 23, 2010

(65) Prior Publication Data

US 2011/0095511 A1    Apr. 28, 2011

Related U.S. Application Data

(63) Continuation of application No. 12/324,942, filed on Nov. 28, 2008, now Pat. No. 7,866,682.

(60) Provisional application No. 61/026,590, filed on Feb. 6, 2008.

(51) Int. Cl.
   *B60G 5/053* (2006.01)
(52) U.S. Cl. ................................ 280/686; 280/124.175
(58) Field of Classification Search .................. 280/686, 280/676, 104, 124.175, 124.17, 682
   See application file for complete search history.

(56) References Cited

U.S. PATENT DOCUMENTS

| | | | |
|---|---|---|---|
| 2,653,035 A | 9/1953 | Ward | |
| 3,186,731 A | 6/1965 | Fossard | |
| 3,202,440 A | 8/1965 | Apgar | |
| 3,279,815 A | 10/1966 | Hutchens | |
| 3,460,851 A | 8/1969 | Schrimpf | |
| 3,580,347 A * | 5/1971 | McGee | 180/22 |
| 3,833,236 A | 9/1974 | Davis et al. | |
| 3,871,677 A | 3/1975 | Blank et al. | |
| 4,085,948 A | 4/1978 | Turner | |
| 4,420,171 A | 12/1983 | Raidel | |
| 5,820,149 A | 10/1998 | Sobina | |
| 6,129,369 A | 10/2000 | Dudding | |
| 6,382,659 B1 | 5/2002 | Simard | |
| 6,485,040 B1 | 11/2002 | Dudding | |

(Continued)

FOREIGN PATENT DOCUMENTS

| | | |
|---|---|---|
| CA | 2070859 | 1/1995 |
| WO | WO 2007/035648 | 3/2007 |

OTHER PUBLICATIONS

Nunney, "Light and Heavy Vehicle Technology", 2006, p. 487, Butterworth-Heinemann.

(Continued)

*Primary Examiner* — Drew Brown
(74) *Attorney, Agent, or Firm* — Merchant & Gould P.C.

(57) ABSTRACT

A pivot assembly for a tandem suspension is provided which includes a balancer and an elastomeric assembly operable to allow the balancer to rotate about a vehicle chassis. In addition, an elastomeric assembly for a suspension system is provided which includes an elastomeric element provided with a slot for allowing a deformation in response to a tension load imparted by a balancer, and a groove for preventing bulging in response to a compression load imparted by the balancer. A balancer for a vehicle suspension is also provided which includes first and second plates, an open area formed between the plates, an engaging member provided within the open area and first and second pins which define an axis of rotation about which the balancer is rotatable. A kit for the pivot assembly is also provided.

4 Claims, 6 Drawing Sheets

U.S. PATENT DOCUMENTS

| | | |
|---|---|---|
| 7,195,272 B2 | 3/2007 | Larson et al. |
| 7,204,500 B2 | 4/2007 | Hunt |
| 7,229,088 B2 | 6/2007 | Dudding et al. |
| 7,296,821 B2 | 11/2007 | Fenton |
| 7,669,867 B2 | 3/2010 | Kuraishi |
| 7,753,399 B2 | 7/2010 | Fenton |
| 2004/0080135 A1 | 4/2004 | Dudding et al. |
| 2005/0189734 A1 | 9/2005 | Dudding et al. |
| 2005/0236798 A1 | 10/2005 | Hunt |
| 2007/0262553 A1 | 11/2007 | Kuraishi |

OTHER PUBLICATIONS

Heisler, "Advanced Vehicle Technology", 2002, p. 24, Butterworth-Heinemann.

Pierce, "Controlled Load Transfer During Braking on a Four-Spring Trailer Suspension", 1995, Abstract, SAE International.

Corriga, "An optimal tandem active-passive suspension system for roadvehicles with minimum power consumption", 1991, Abstract, IEEE Transactions on Industrial Electronics.

* cited by examiner

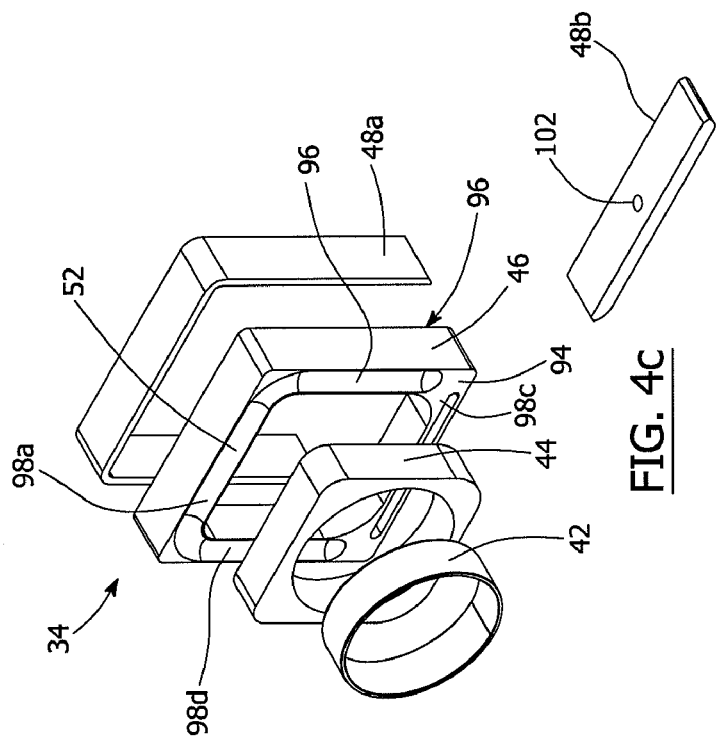
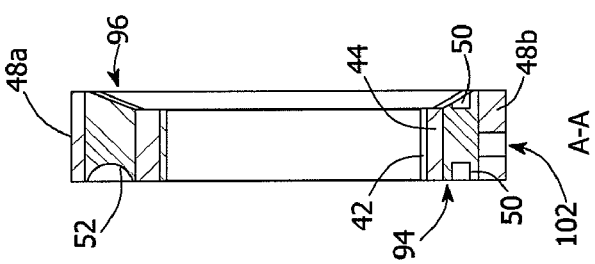
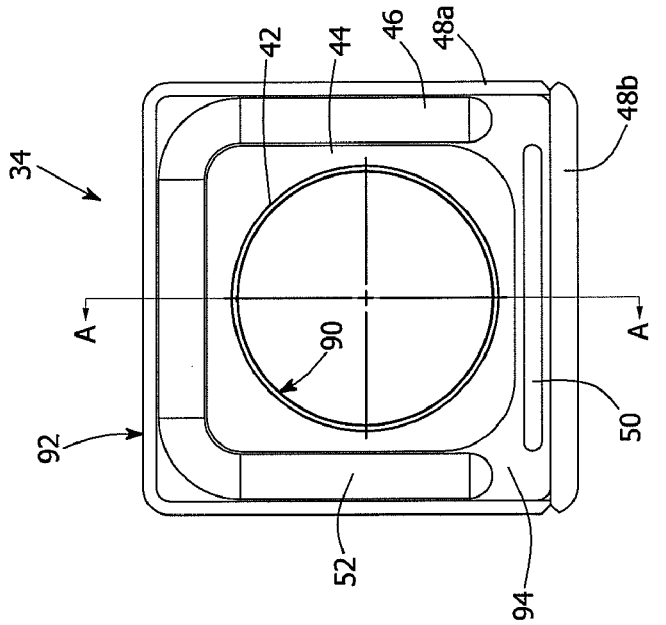

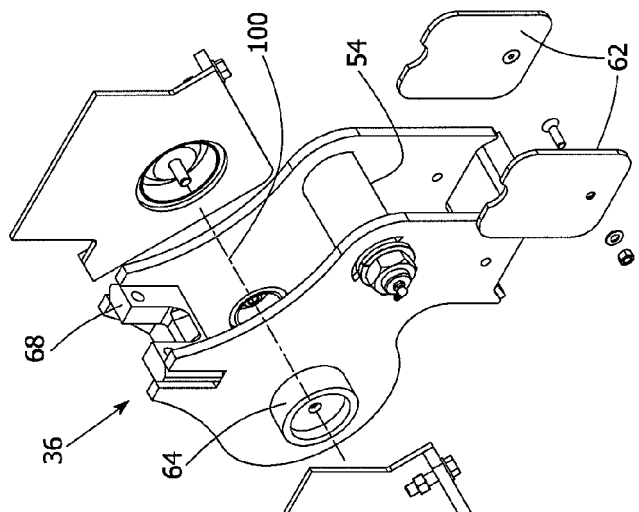
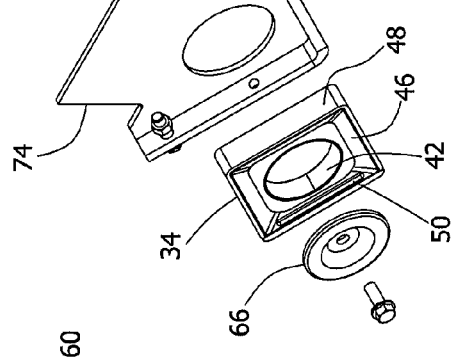
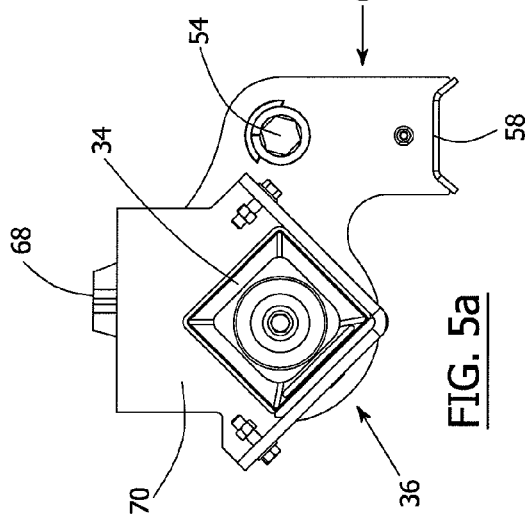
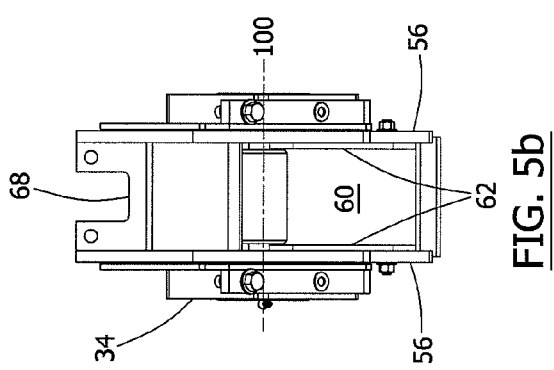

TANDEM SUSPENSION FOR A VEHICLE

This application is a continuation of U.S. Ser. No. 12/324,942, filed 28 Nov. 2008, which claims benefit of U.S. Ser. No. 61/026,590, filed 6 Feb. 2008 and which applications are incorporated herein by reference. To the extent appropriate, a claim of priority is made to the above disclosed applications.

FIELD OF THE INVENTION

The present invention relates to a tandem suspension for a vehicle.

BACKGROUND OF THE INVENTION

Suspensions for vehicles such as trucks and the like are very well known in the art.

Indeed, a conventional vehicle suspension connects an axle to the structural frame, or chassis, and includes a combination of springs and shock absorbers for absorbing, isolating and dampening the movements transmitted between the axle and the chassis. Typically, a vehicle such as a truck will include a front axle supporting a pair of front wheels and at least one rear axle supporting a pair of rear wheels. A second (rear tandem) and even third (rear tridem) rear axle can be provided to increase the load capacity of a given truck.

It is also known in the art to provide a second front axle to further increase the load capacity of a truck. Such a front suspension is called a front tandem suspension.

Canadian Patent No. 2,070,859, issued Jan. 10, 1995 to Simard and titled "Tandem Axle Suspension for Vehicle", describes a front suspension for a truck or semi-trailer including front and rear tandem axles connected to a vehicle chassis by first and second leaf springs, respectively. In order to distribute the load evenly between the front and rear axles, an equalizer beam is provided rockably mounted onto the chassis and connected at one end to the rear extremity of the first leaf spring, and at the other end to the front extremity of the second leaf spring.

U.S. Pat. No. 6,382,659, issued May 7, 2002 to Simard and titled "Load Distributing Tandem Suspension Assembly", describes a front tandem suspension similar to that described above, with the addition of an air spring and a shock absorber for supporting the second front axle in conjunction with the second leaf spring.

Also known in the art, are the following patents and published patent applications: U.S. Pat. No. 3,460,851, U.S. Pat. No. 3,833,236, U.S. Pat. No. 3,871,677, U.S. Pat. No. 3,202,440, U.S. Pat. No. 4,420,171, U.S. Pat. No. 5,820,149, U.S. Pat. No. 7,195,272 and WO 2007/035648.

Tandem suspension systems typically include a pivot assembly which links an extremity of each leaf spring to vehicle's chassis. In order to improve driver comfort and minimize wear on the vehicle, it is known to provide an elastomeric element, such as a sleeve or bushing at a pivot point between a leaf spring and the chassis. This bushing is operable to absorb the micro-shocks and oscillations imparted from the road during operation.

It is known to mechanically link the front and rear leaf springs in a tandem suspension in order to share load therebetween. Due to the variety of arrangements that such suspension systems may utilize to connect, and distribute load between, the front and rear leaf springs, there exist a number of possible placements for such an elastomeric bushing between suspension elements.

For example, the tandem suspension disclosed in U.S. Pat. No. 6,382,659 (Simard) provides an equalizer beam extending between the front and rear extremities of the rear and front leaf springs. The equalizer beam is pivotally mounted to the chassis by a bracket and operable to distribute suspension loads between the leaf springs. It is known to provide the elastomeric element at the pivoting connection of the equalizer beam and its bracket.

For example, U.S. Pat. No. 3,279,815, issued Oct. 18, 1966 to Hutchens and titled "Suspension Assembly for a Vehicle and Process", describes a first resilient sleeve which is fixed between an axle and a torque arm and second resilient sleeve which is fixed between the chassis and a balancer.

Similarly, U.S. Pat. No. 3,186,731, issued Jun. 1, 1965 to Fossard and titled "Vehicle Suspensions", describes a rubber sleeve fixed between the equalizer and the pivotal support therefor.

For its part, U.S. Pat. No. 2,653,035, issued Sep. 22, 1953 to Ward and titled "Torque Rod Assembly for Spring Suspension", describes a rubber bushing fixed between an axle and a torque arm.

Also known in the art are the various disadvantages associated with these types of conventional suspension systems.

The elastomeric bushings in conventional suspension systems are typically fixed to both the pivoting member, for example an equalizer beam or balancer, and the chassis bracket by, for example, force fitting or bonding the bushing between the two elements. Therefore, in use, the bushing will deflect angularly as the pivoting member pivots about the bracket. Minor angular deflections of up to 1°, such as those which occur when absorbing micro-shocks and vibrations, are handled effectively by the bushing. However, major angular deflections, such as those that occur when driving through potholes and the like, have been found to be a major cause of wear on conventional elastomeric bushings. Consequently an elastomeric bushing will tear and split, and may need to be replaced after as little as 50,000 km. This is in contrast with the remainder of the suspension system which could otherwise have an operational life of 250,000 km or more.

Another drawback of conventional pivot assemblies is that conventional elastomeric bushings are only able to deflect by at most 10°, and conventional pivot assemblies therefore typically provide mechanical stoppers which physically limit the rotation of the pivot member. However, it has been found that it would be advantageous to enable the pivot assembly to take angular displacements of up to 20° in situations such as braking and shock loading. Typically, when this limit is reached and the bushing is stopped from deflecting more than 10°, the equalizer assembly is prevented from further distributing the load between front and rear leaf springs, thereby reducing the overall effectiveness of tandem suspension and its load distribution capabilities.

Hence, in light of the afore-mentioned, there is a need to provide an improved pivot assembly for a tandem suspension which by virtue of its design and components would be able to overcome at least some of the prior art problems.

SUMMARY OF THE INVENTION

In accordance with an aspect of the present invention, there is provided a pivot assembly for a tandem suspension, the tandem suspension including a chassis, front and rear axles, and front and rear leaf springs for connecting a respective one of the front and rear axles to the chassis, each leaf spring having an extremity mounted to the chassis via a bracket, the pivot assembly including for each of the front and rear leaf springs:
  a) a balancer including:
    i) an engaging member for engaging the extremity of the corresponding leaf spring; and
    ii) a pin extending outwardly from the balancer and offset from the engaging member;

b) an elastomeric assembly operable to allow the balancer to rotate about the bracket and including:
   i) an inner surface for receiving the pin;
   ii) an outer surface for engaging the bracket; and
   iii) an elastomeric element extending between the outer surface and the inner surface for absorbing vibrations, wherein the pin is rotatable with respect to the elastomeric element or the elastomeric element is rotatable with respect to the bracket;
wherein the pivot assembly further includes a connector linking the respective balancers of the front and rear leaf springs for load distribution therebetween.

Preferably, each elastomeric assembly is fixed to the bracket and the pin is rotatable with respect to the elastomeric assembly and the bracket.

Preferably, for each of the front and rear leaf springs:
a) the pin is a first pin and the balancer includes a second pin which extends therefrom in an opposite direction to the first pin; and
b) the elastomeric assembly is a first elastomeric assembly and the pivot assembly includes a second elastomeric assembly, the first and second elastomeric assemblies being positioned on opposing sides of the balancer, the first and second elastomeric assemblies receiving the first and second pins, respectively.

In accordance with another aspect of the present invention, an elastomeric assembly for a vehicle suspension is provided including a bracket and a balancer, the elastomeric assembly including:
a) an outer surface for engaging the bracket;
b) an inner surface for engaging a balancer and operable to allow the balancer to rotate with respect thereto;
c) an elastomeric element extending between the outer surface and the inner surface for absorbing vibrations, the elastomeric element including:
   i) a pair of opposing lateral faces, each lateral face including a plurality of sides;
   ii) a slot for allowing a deformation in response to a tension load imparted by the balancer, the slot being provided on one of the pair of opposing faces, the slot extending longitudinally along a one of the plurality of sides; and
   iii) a groove for preventing bulging of the elastomeric element in response to a compression load imparted by the balancer, the groove being provided on one of the pair of opposing faces and extending along another of the plurality of sides.

Preferably, the plurality of sides consists of four sides.

In accordance with another aspect of the present invention, a balancer for a vehicle suspension is provided including a chassis and a leaf spring, the leaf spring having an extremity, the balancer including:
a) first and second plates;
b) an open area formed between the first and second plates;
c) an engaging member provided within the open area for engaging the extremity of the leaf spring; and
d) first and second pins extending outwardly from the first and second plates, respectively, the pins defining an axis of rotation about which the balancer is rotatable with respect to the chassis, the axis of rotation spanning the open area, the pins being offset from the engaging member.

In accordance with another aspect of the present invention, a kit for a pivot assembly for a tandem suspension is provided, the tandem suspension including a chassis, front and rear axles, and front and rear leaf springs for connecting a respective one of the front and rear axles to the chassis, each leaf spring having an extremity mounted to the chassis via a bracket, the kit including for each of the front and rear leaf springs:
a) a balancer including:
   i) an engaging member for engaging the extremity of the corresponding leaf spring; and
   ii) a pin extending outwardly from the balancer and offset from the engaging member;
b) an elastomeric assembly operable to allow the balancer to rotate about the bracket and including:
   i) an inner surface for receiving the pin;
   ii) an outer surface for engaging the bracket; and
   iii) an elastomeric element for absorbing vibrations and operable to extend between the outer surface and the inner surface, wherein the pin is rotatable with respect to the elastomeric element or the elastomeric element is rotatable with respect to the bracket;
wherein the kit further includes a connector for linking the respective balancers of the front and rear leaf springs for load distribution therebetween.

In accordance with a yet further aspect of the present invention, there is provided a tandem suspension for a vehicle having a chassis, a front axle and a rear axle. The tandem suspension includes on each side of the vehicle a first leaf spring for connecting one of the front and rear axles to the chassis, a second leaf spring for connecting the other of the front and rear axles to the chassis, first and second balancers, and a connector for load distribution between the first and second leaf springs which links the first and second balancers. The first leaf spring includes opposed first and second extremities. The one of the front and rear axles is mounted between the first and second extremities of the first leaf spring. The first extremity of the first leaf spring is pivotally mounted to the chassis. The first balancer is rotatable with respect to the chassis about an axis of rotation. The first balancer includes an engaging member for engaging the second extremity of the first leaf spring. The axis of rotation of the first balancer is offset from the respective engaging member towards the one of the front and rear axles. The second leaf spring includes opposed first and second extremities. The other of front and rear axles is mounted between the first and second extremities of the second leaf spring. The first extremity of the second leaf spring is pivotally mounted to the chassis. The second balancer is rotatable with respect to the chassis about an axis of rotation. The second balancer includes an engaging member for engaging the second extremity of the second leaf spring. The axis of rotation of the second balancer is offset from the respective engaging member away from the other of the front and rear axles. The axes of rotation of the first and second balancers are offset in opposite directions with respect to the chassis.

It will be appreciated that a pivot assembly for a suspension in accordance with the present invention may advantageously be more robust, may not wear as quickly and hence may not need replacing as soon. It will further be appreciated that a pivot assembly for a suspension in accordance with the present invention may advantageously be adapted to absorb minor shocks and vibrations while also fully accommodating major angular deviations.

It will be appreciated that an elastomeric assembly in accordance with the present invention may advantageously deform in response to loads imparted from the suspension to the chassis while preventing tearing of those portions in tension and bulging and scrubbing of those portions in compression.

It will also be appreciated that a balancer for in accordance with the present invention may advantageously provide improved packaging of the balancer, leaf spring and associated components within the suspension.

The invention and its advantages will be better understood by reading the following non-restrictive description of a preferred embodiment thereof, made with reference to the accompanying drawings.

BRIEF DESCRIPTION OF THE DRAWINGS

FIGS. 4a to 4c are a front, cross-sectional and exploded perspective view, respectively, of an elastomeric assembly in accordance with an embodiment of the present invention.

FIGS. 5a to 5c are a side, rear and exploded view, respectively, of a balancer in accordance with an embodiment the present invention.

DETAILED DESCRIPTION OF PREFERRED EMBODIMENTS OF THE INVENTION

In the following description, the same numerical references refer to similar elements. The embodiments shown in the figures are preferred, for exemplification purposes only.

In the context of the present description, the expression "truck" includes all types of vehicles, automotive or otherwise, suitable for transporting cargo, as apparent to a person skilled in the art such as, for example, merchandise trucks, dump trucks, garbage trucks, oil or other fluid transport vehicles and the like. However, it will be appreciated that application of the present invention is not limited to trucks. Rather, application of the present invention on any vehicle with a tandem axle arrangement is within the scope of the invention.

In addition, although the preferred embodiments of the present invention as illustrated in the accompanying drawings comprise various components, etc., and although the preferred embodiments of the present invention as shown consist of certain geometrical configurations as explained and illustrated herein, not all of these components and geometries are essential to the invention and thus should not be taken in their restrictive sense, i.e. these components and geometries should not be taken as to limit the scope of the present invention. It is to be understood, as also apparent to a person skilled in the art, that other suitable components and cooperations therebetween, as well as other suitable geometrical configurations may be used according to the present invention, without departing from the scope of the invention.

Figure 1:
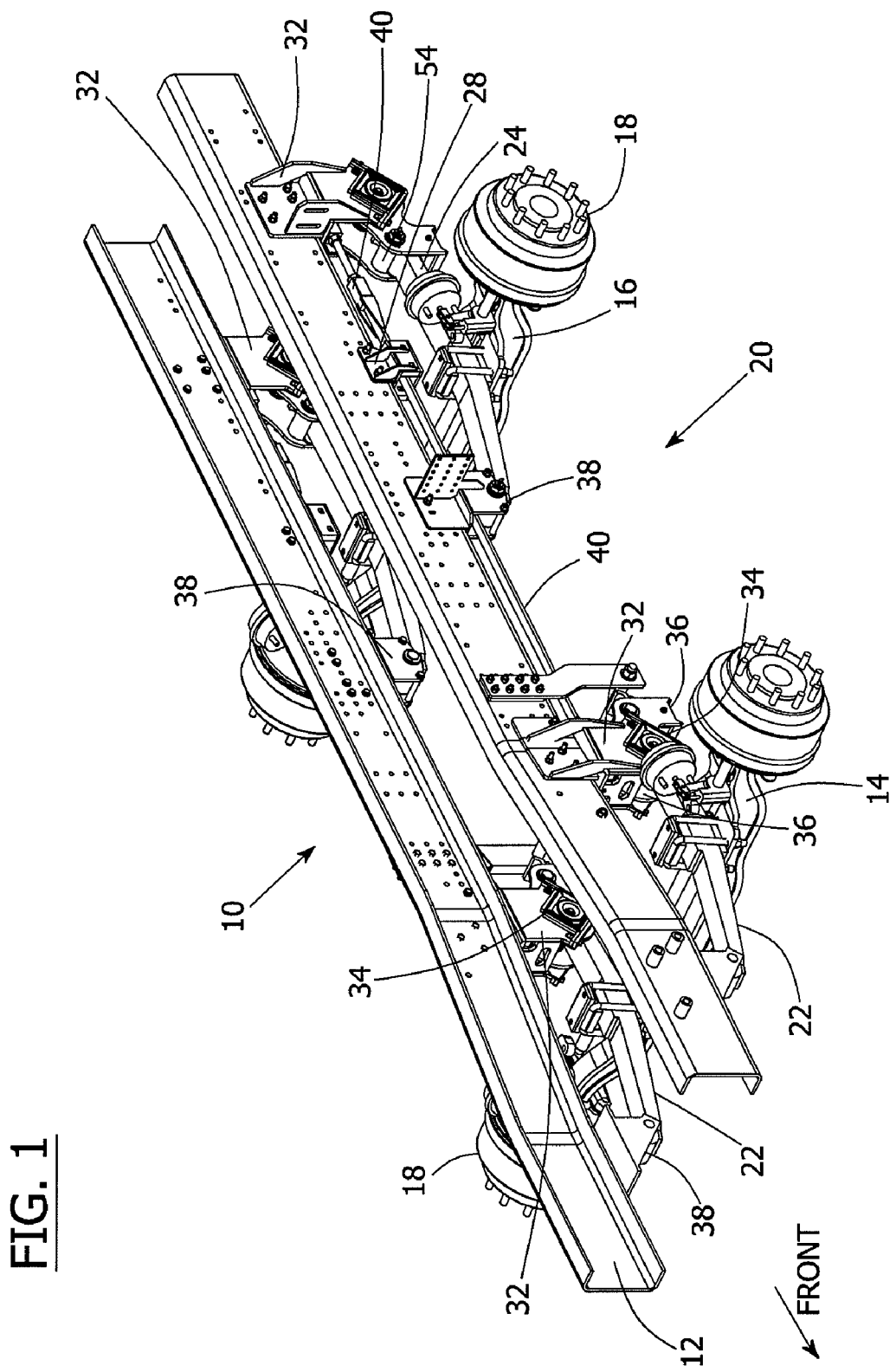
FIGS. 1 to 3 are a perspective, side, and top view, respectively, of a tandem suspension incorporating a pivot assembly in accordance with an embodiment of the present invention.
Figure 2:
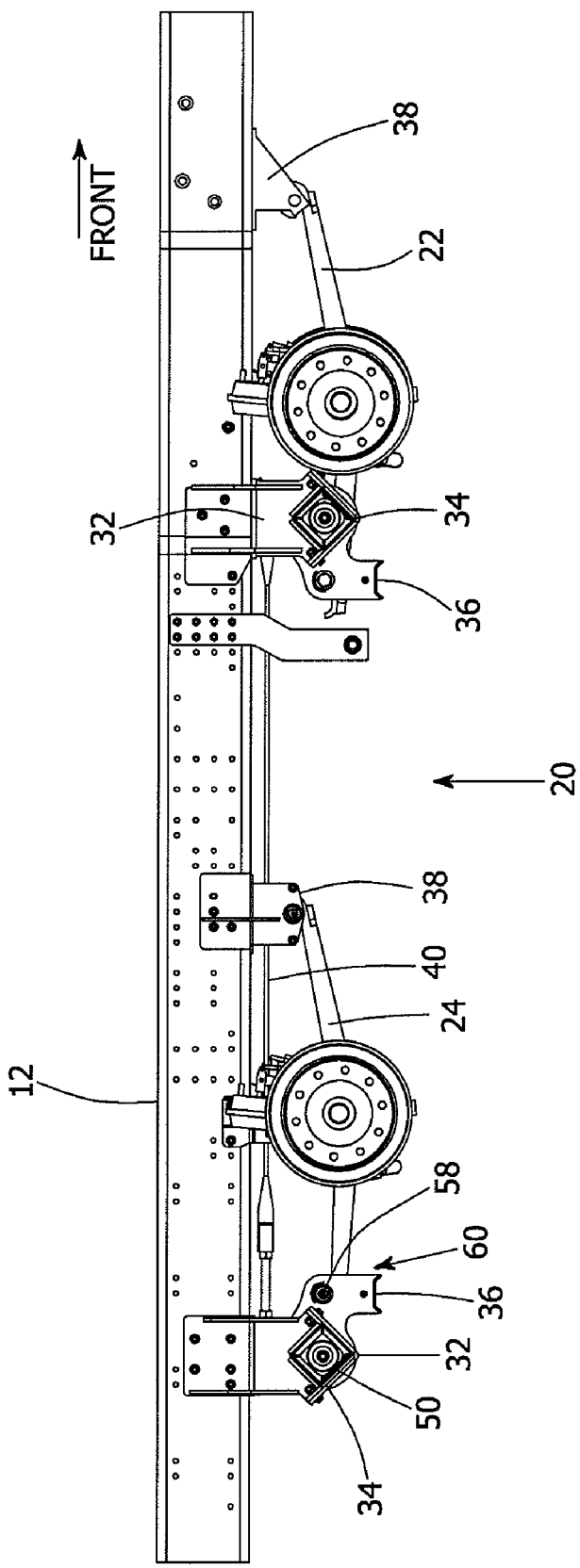
Figure 3:
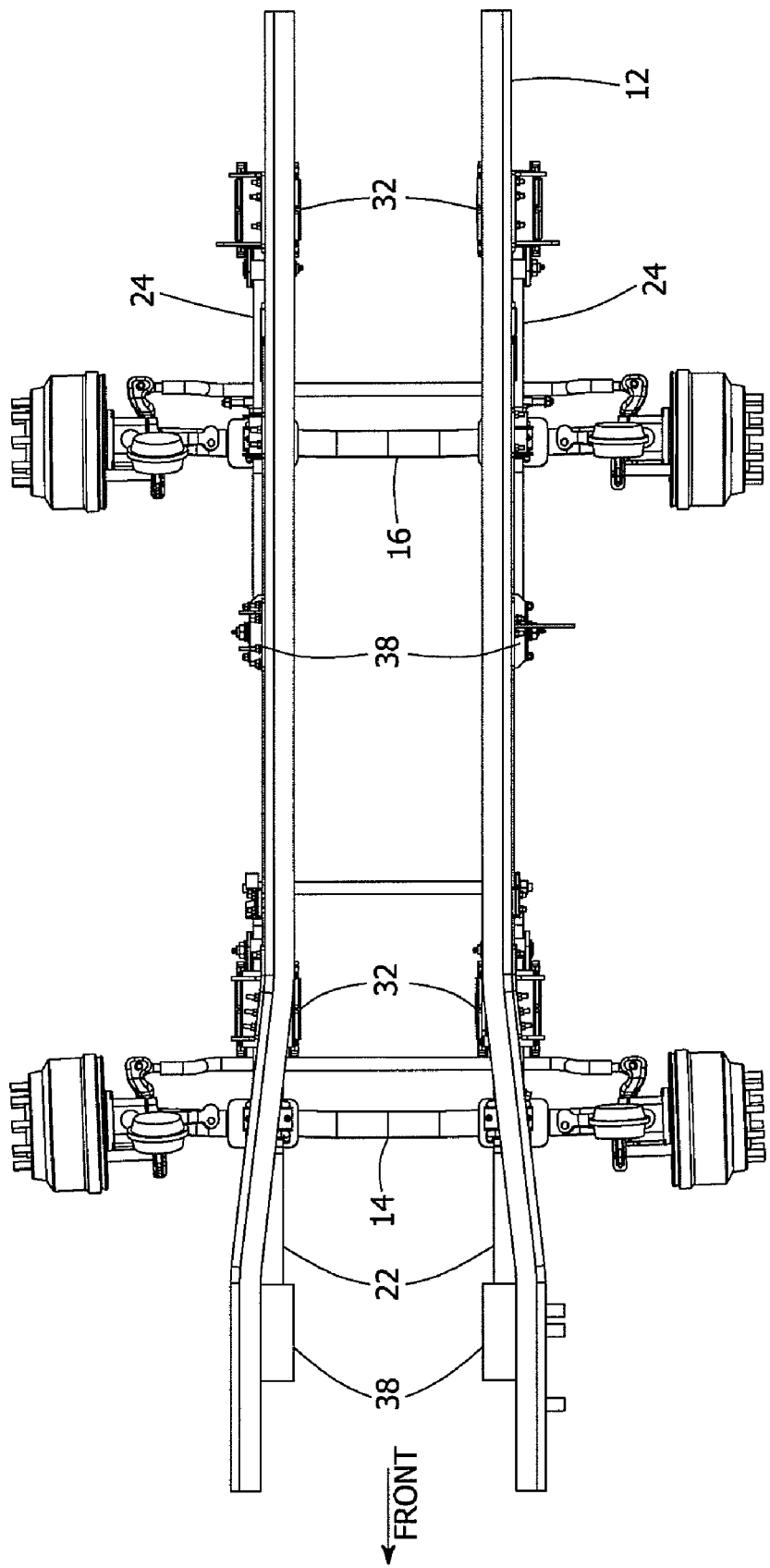

Referring to FIGS. 1 to 3, there is shown a tandem suspension system 10 for a vehicle such as a truck according to one embodiment, which links a chassis 12 to front and rear axles 14 and 16. At the end of each axle 14 and 16 are wheel hubs 18. The tandem suspension system 10 includes a pivot assembly 20 which connects the chassis 10 to each of the front and rear leaf springs 22 and 24.

The tandem suspension system 10 further includes an axle stopper assembly 28 positioned along the chassis above each axle 14 and 16 for limiting the maximum deflection of the leaf springs 22 and 24 towards the chassis 12.

The pivot assembly 20 includes a plurality of balancer brackets 32 which are fixed to the chassis 12. Each of the four balancer brackets 32 illustrated retains a respective elastomeric assembly 34 which is operable to at least partially absorb minor shocks and vibrations imparted through respective leaf springs 22 and 24. An extremity of each leaf spring 22 and 24, preferably, but not limitatively, the rear extremity, is received by a balancer 36 which is pivotally connected to a respective balancer bracket 32, via the corresponding elastomeric assembly 34. The front and rear balancers 36 on each side of the chassis 12 are linked by a connector 40, such as a connection bar. The connection bar 40 is operable to distribute load between front and back leaf springs 22 and 24. The other extremity of each leaf spring 22 and 24, preferably the front extremity, is pivotally connected to the chassis via a spring bracket 38. The left and right side connectors 40 preferably run along the underside of the chassis 12, through the axle stopper assembly 28 and the spring bracket 38.

Preferably, and as will be discussed in more detail herein below, each balancer is doubly supported within the balancer bracket 32 via a pair of elastomeric assemblies 34.

With reference now to FIGS. 4a to 4c, an embodiment of the elastomeric assembly 34 is shown in more detail. The illustrated elastomeric assembly 34 includes an inner sleeve 42 which defines an inner surface 90, a square adapter 44, an elastomeric element 46 and an outer sleeve 48 which defines an outer surface 92. Preferably, the outer sleeve 48 comprises a first outer sleeve portion 48a and a second outer sleeve portion 48b which combine to enclose the elastomeric element 48.

The elastomeric assembly 34 is provided between balancer 36 and the chassis 12 in order to absorb at least some of the micro-shocks and vibrations which are transmitted to the suspension 10 during use. As will be described in further detail herein below, the elastomeric element 46 within the assembly 34 does not undergo major torsional deflection as the balancer 36 pivots with respect to the chassis 12, thereby protecting it from the potentially damaging torsional loads experienced in conventional pivot assemblies.

Figure 6B:
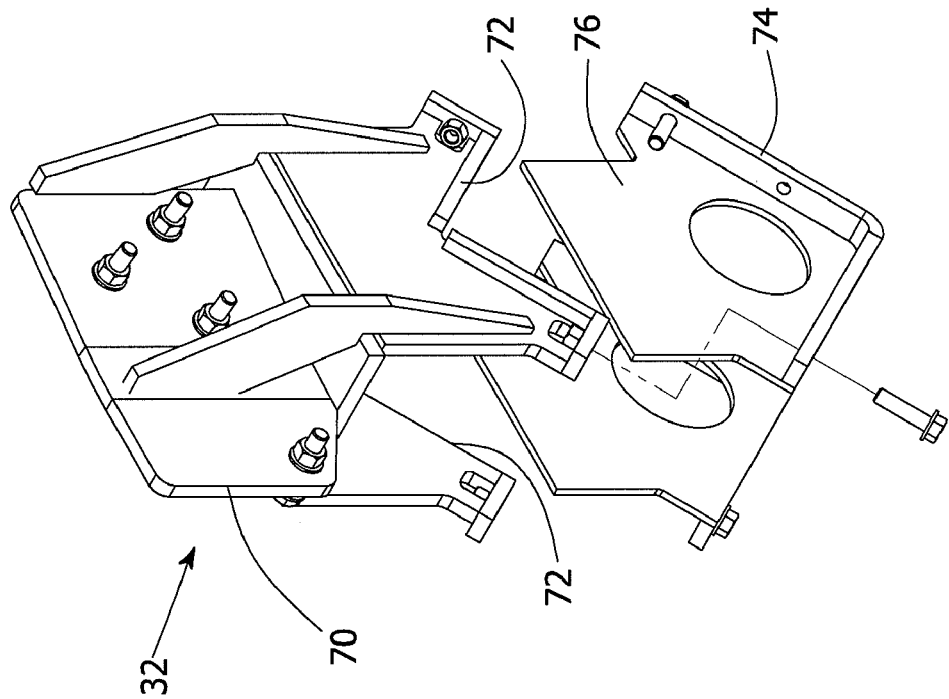
FIGS. 6a and 6b are a perspective and exploded view, respectively, of a balancer bracket in accordance with an embodiment of the present invention.
Figure 6A:
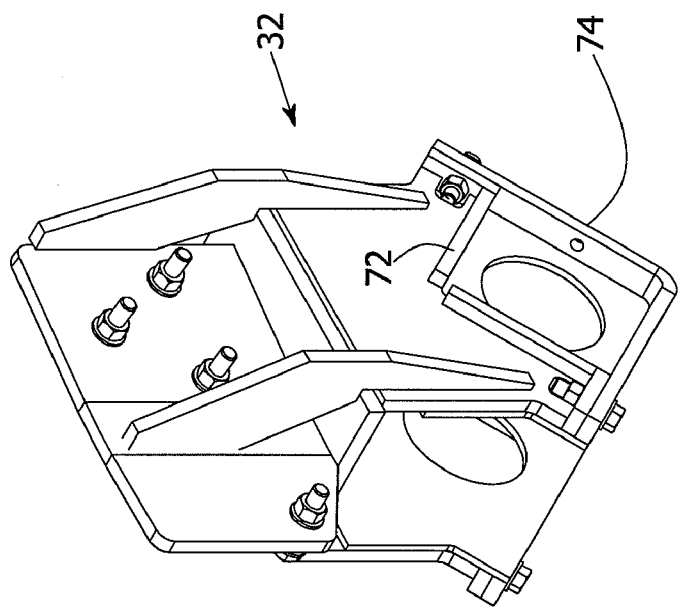

Preferably, and as illustrated, the elastomeric assembly 34 is fixed to the chassis 12 within a balancer bracket 32 such as the one illustrated in FIGS. 6a and 6b, and the balancer 36 is rotatable within the inner surface 90. It will be appreciated however that embodiments wherein the elastomeric assembly 34 is fixed to an equivalent balancer 36 and these two are operable to rotate together with respect to an equivalent balancer bracket 32 are also within the scope of the present invention. Similarly, an elastomeric assembly 34 which is held between a balancer bracket 32 and a balancer 36 but fixed to neither and, more importantly, rotatable with respect to both, would similarly protect the elastomeric element 46 from potentially damaging torsional loads and should also be considered as within the scope of the present invention.

The inner sleeve 42 is preferably made with a rigid, dry lubricated material treated with a thermochemical diffusing process in order to increase its wear and fatigue characteristics wherein the compound layer acts as a dry lubricant and contributes to a low coefficient of friction, minimizes seizing and galling, raises scuff load limits and gives high corrosion resistance. Alternatively, the inner sleeve 42 may be made of a combination of three elements: a) a steel backing b) a porous bronze inner structure comprising a layer of bearing quality powdered bronze sintered onto the steel backing and impregnated with a homogenous mixture of polytetrafluoroethylene and lead, and c) an overlay of polytetrafluoroethylene and lead which provides a low friction bearing surface. As will be appreciated, the inner sleeve 42 may also be lubricated by grease or other wet lubrication methods, or impregnated or otherwise treated with a low friction substance, as is known in the art.

The square adapter 44 is preferably provided as a spacer between the tubular inner sleeve 42 and the square elastomeric element 46. The square adapter 44 may advantageously prevent bulging and other unwanted deformation of the elastomeric element 46 during loading, although it will be appreciated that an elastomeric assembly 34 in which the sleeve 42 directly engages the elastomeric element 46 is also well within the scope of the present invention.

The elastomeric element 46 extends between the inner and outer surfaces 90 and 92, and is operable to absorb shocks and vibrations transmitted from the wheels, through the axles, to the suspension system. It is preferably made of a resilient, flexible and/or compliant material such as rubber while having sufficient hardness to provide the necessary absorption rate to dampen the high frequency micro angular and radial displacements while providing sufficient toughness to resist major angular movement of the inner sleeve 42 as the balancer 36 pivots thereabout under shock loads and braking conditions.

The elastomeric element 46 shown in FIGS. 4a, 4b and 4c includes an opposing first and second lateral faces 94 and 96 which are substantially parallel to one another, although it will be appreciated that they may not be exactly parallel. As seen FIG. 4b for example, the right side face 96 is provided with a chamfered profile in order to accommodate other, unseen, suspension elements.

The lateral faces 94 and 96 include a plurality of sides 98. Preferably, and as illustrated, four such sides 98a to 98d are provided. Accordingly, the adapter 44, the outer sleeve 48 and the balancer bracket 32 have corresponding four-segment shapes as well. This plurality of sides 98 may help to stabilize the elastomeric assembly 34 within the balancer bracket 32.

In the embodiment illustrated, the balancer 36 rotates about its engagement with the inner sleeve 42 which is therefore given a circular shape. The adaptor 44 is provided to form a bridge between the circular inner sleeve 42 and the four sides 98a to 98d of the elastomeric element 46.

The elastomeric element 46 is retained from the outside by the outer sleeve 48 which is preferably formed from square tubing. The inner sleeve 42 is preferably force fit, or otherwise frictionally retained, within the square adaptor 44. The square adaptor 44, elastomeric element 46 and square tubing 48 are preferably adhesively bonded to one another.

The elastomeric element 46 is preferably square-shaped with rounded corners. The elastomeric element 46 preferably includes a slot 50 on one or both of the opposing faces 94 and 96 which extends longitudinally along one of the sides 98. In the embodiment illustrated in FIGS. 4a to 4c, a slot 50 is provided on each face 94 and 96 along the bottom side 98c, although it will be appreciated that other embodiments comprising a slot 50 extending along a single lateral face 94 or 96, or indeed a single slot 50 extending through the elastomeric element from the first lateral face 94 to the second lateral face 96, are well within the scope of the present invention.

Preferably, the second outer sleeve portion 48b is provided adjacent the bottom side 98c which comprises the slot 50. This second portion 48b thicker than the first portion 48a and is bolted to the balancer bracket 32 through a hole 102 provided therein.

The elastomeric element 46 preferably also includes a groove 52 provided along the lateral face 94 which extends along another of the sides 98. The groove 52 is provided on the side 98a opposite that of the slot 50. Preferably, the groove 52 is extended to the remaining sides 98b and 98d. When the elastomeric assembly 34 is installed on a loaded vehicle, it is aligned such that the side 98c is under tension while the opposing side 98a is under compression. The slot 50 is positioned opposite the applied force, as seen in FIGS. 1 and 2, such that the area around the slot 50 may preferentially deform in response to that tension and thereby limit the force applied to the square tubing 48. The slot 50 provides a discontinuity in the elastomeric element 46 which can advantageously release some of the tension therein, thereby promoting allowing this area to deform and preventing the elastomeric element 46 from tearing.

The groove 52 extends around the remaining three sides 98a, 98b and 98d and prevents bulging and other deformation of the elastomeric element 46 which may be caused under compression and could otherwise potentially touch and/or scrub adjacent elements.

It will be appreciated that the elastomeric assembly 34 could also be advantageously used to connect vehicle chassis with various other types of balancers, such as the equalizer beams described in CA 2,070,589 (Simard), U.S. Pat. No. 6,382,659 (Simard).

With reference now to FIGS. 5a to 5c, the balancer 36 according to an embodiment is illustrated in more detail. The balancer 36 includes first and second plates 56 which form an open area 60 therebetween, and an engaging member 54 for connecting to an extremity of the leaf spring 22 or 24. While the plates 56 are preferably parallel, as illustrated, this relationship is less important as the fact that the open area 60 is created therebetween and the balancer 36 is rotatable about the balancer bracket 32.

The engaging member 54 is preferably a roller 54, although it will be appreciated that various other embodiments of the engaging member 54 may be provided, such as a pivot and shackle, in order to engage various other types of leaf spring. Here, the leaf spring 22 or 24 is received in the area between the roller 54 and a bottom plate 58 and a pair of wear shims 62 are fixed to the inside of the plates 56 to prevent damage thereto and which can be replaced to accommodate various sized leaf springs.

A pin 64 extends outward from each plate 56. The pins 64, which are formed as tubular elements in the illustrated embodiment, are aligned together and define an axis of rotation 100 about which the balancer 36 is rotatable with respect to the chassis 12. The axis 100 defined by the pins 64 is offset from the roller 54. Each pin 64 fits closely within an inner sleeve 42 of a respective elastomeric assembly 34, thereby allowing the balancer 36 to pivot. The pins 64 may be made with a rigid, dry lubricated material treated with a thermochemical diffusing process, or according to any other process discussed previously in relation to the inner sleeves 42. In this manner, when a given pivot assembly undergoes a major angular deviation each balancer 36 is free to pivot with respect to the chassis 12 between the pair of elastomeric assemblies 34 without subjecting the elastomeric element 44 to a major twisting force. As discussed, this isolation of the elastomeric elements, while absorbing minor loads and oscillations, enables a greater rotation of the balancer and hence a greater distribution of the load between front and back leaf springs 22 and 24.

Preferably, each balancer 36 is supported on either side by an elastomeric assembly 34 which is mounted in a balancer bracket 32 and therefore fixed with respect to the chassis 12. Also illustrated are a pair of clamps 74 which are disposed on either side of the balancer 36 and form a part of the respective balancer bracket 32, as will be discussed in further detail below. In the embodiment illustrated in FIGS. 5a to 5c, the first lateral face 94 and the groove 52 included thereon are positioned adjacent the clamp 74.

The elastomeric assemblies are preferably retained on the pins 64 via holding cap 66. In the illustrated embodiment, the balancer 36 is doubly supported the pair of pins 64. Moreover, the open area 60 created between the plates extends not just in the area between the roller 54 and the bottom plate 58 which engages the leaf spring 22 or 24, but between the pins 64 such that the axis of rotation 100 spans this space. As such, the corresponding leaf spring 22 or 24 is advantageously able to engage the roller from either side.

This advantage is seen most clearly in FIG. 2, wherein the relative front-to-back positions of the suspension elements are illustrated from the side. As previously discussed, in this embodiment the rear leaf spring 24 is mounted at its front extremity by a spring bracket 38 and at its rear by a balancer 36 which is in turn attached to a balancer bracket 32. Here, the balancer 36 and the rear leaf spring 24 are oriented such that the bracket 32 and spring 24 are substantially opposite one another with respect to the balancer 36. In contrast, the front leaf spring 22 and its corresponding balancer 36 are arranged such that the front leaf spring 22 extends through the open area 60. Even when the front leaf spring 22 undergoes a large deflection towards the chassis 12, there will be no conflict between the leaf spring 22 and either the balancer 36 or the bracket 32 since the front leaf spring 22 is free to pass between the resilient assemblies 34 and the plates 56 of the balancer 36. It will be appreciated that such an arrangement allows for a tighter packaging of the components of the suspension system 10. While this is especially advantageous in the area surrounding the front leaf spring 22 which may also contain steering assemblies and the like, for example, it will be appreciated that this arrangement may similarly be used on the rear leaf spring 24.

It will be appreciated that because the balancers 36 both engage the rear extremity of their respective leaf spring 22 and 24, the forces imparted during braking will not be transmitted between the springs 22 and 24 as they would be in a tandem suspension which connects the front extremity of one spring with the rear extremity of the other. It will further be appreciated that a similar effect would occur in a tandem suspension which connected the front extremity of each leaf spring.

Referring again to FIGS. 5a to 5c, a connector bracket 68 is positioned at a distance from the axis 100 and the pins 64, and receives an extremity of the connector 40. When assembled, the two balancers 36 on each side of the vehicle are linked by the connector 40 at respective connector brackets 68. As such, any angular displacement of a front balancer 36 will be transmitted to the rear balancer 36, and vice versa, via the connector 40. Preferably, the connector bracket 68 is provided substantially above pins 64 while the roller 54 is provided to the side of the pins. It will be appreciated however that embodiments incorporating variations on these relative positions are within the scope of the invention.

The arrangement provided by the illustrated embodiment allows the connector 40 to always be in tension. It will be appreciated however that the pivot assembly 20, the elastomeric assembly 34 and the balancer 36 may also be used in various other arrangements, including wherein the connector 40 is a compression member or a tension/compression member.

As will be apparent, a balancer 36 including an alternate receiving portion 60 designed to receive another type of leaf spring 22 and 24, such as via eyelet or shackle, is within the scope of the present invention.

With reference now to FIGS. 6a and 6b, a preferred embodiment of the balancer bracket 32 is illustrated in more detail. The balancer bracket 32 includes a body 70, a pair of seats 72 and a pair of clamps 74. The body 70 is fixed to the chassis 12, while the clamps 74 cooperate with the seats 72 in order to retain a pair of elastomeric assemblies 34. Each clamp 74 preferably comprises a wear plate 76 in order to prevent damage. Preferably, each plate 76 is welded to a respective clamp 74. Preferably, a mechanical stopper is fixed to the underside of the body 70 for preventing over-rotation of the balancer 36 within the bracket 32 by engaging its connector bracket 68. Preferably, the stopper may be modified so as to vary the angle at which the connector bracket 68 abuts the stopper 76.

It will be appreciated that in another embodiment of the present invention, a single elastomeric assembly 34 and pin 64 may be provided per balancer 36 and bracket 32 combination. It will further be appreciated that the embodiments discussed herein could similarly be provided as a kit wherein the individual components are then assembled by the user.

As being now better appreciated, the present invention is an improvement and presents several advantages over other related devices and/or methods known in the prior art.

Of course, numerous modifications could be made to the above-described embodiments without departing from the scope of the invention, as apparent to a person skilled in the art. While a specific embodiment of the present invention has been described and illustrated, it will be apparent to those skilled in the art that numerous modifications and variations can be made without departing from the scope of the invention.

The invention claimed is:

1. A tandem suspension for a vehicle having a chassis, a front axle and a rear axle, the tandem suspension comprising on each side of the vehicle:
   a. a first leaf spring for connecting one of the front and rear axles to the chassis, the first leaf spring comprising opposed first and second extremities, the one of the front and rear axles being mounted between the first and second extremities, the first extremity of the first leaf spring being pivotally mounted to the chassis;
   b. a first balancer which is rotatable with respect to the chassis about an axis of rotation, the first balancer comprising an engaging member for engaging the second extremity of the first leaf spring, the axis of rotation being offset from the engaging member towards the one of the front and rear axles;
   c. a second leaf spring for connecting the other of the front and rear axles to the chassis, the second leaf spring comprising opposed first and second extremities, the other of front and rear axles being mounted between the first and second extremities, the first extremity of the second leaf spring being pivotally mounted to the chassis;
   d. a second balancer which is rotatable with respect to the chassis about an axis of rotation, the second balancer comprising an engaging member for engaging the second extremity of the second leaf spring, the axis of rotation being offset from the engaging member away from the other of the front and rear axles, wherein the axes of rotation of the first and second balancers are offset in opposite directions with respect to the chassis;
   e. a connector for load distribution between the first and second leaf springs, the connector linking the first and second balancers;
   each of the first and second balancers comprising:
      first and second plates forming an open area therebetween, each of the engaging members extending between the respective first and second plates; and
      first and second pins extending concentrically around the respective axis of rotation, the first pin extending from the first plate and the second pin extending in an opposite direction to the first pin from the second plate.

2. The tandem suspension of claim 1, wherein the first leaf spring is connected to the front axle and the second leaf spring is connected to the rear axle.

3. The tandem suspension of claim 2, wherein the first and second extremities of each leaf spring are front and rear extremities, respectively.

4. The tandem suspension of claim 1, wherein the first and second engaging members are rollers.

* * * * *